Sept. 23, 1952          S. CRUM ET AL          2,611,542

FLUID-FLOW CONTROL DEVICE AND SYSTEM

Filed Aug. 23, 1948          2 SHEETS—SHEET 1

Inventors
HUBERT T. SPARROW
STEPHEN CRUM

BY George H. Fisher
Attorney

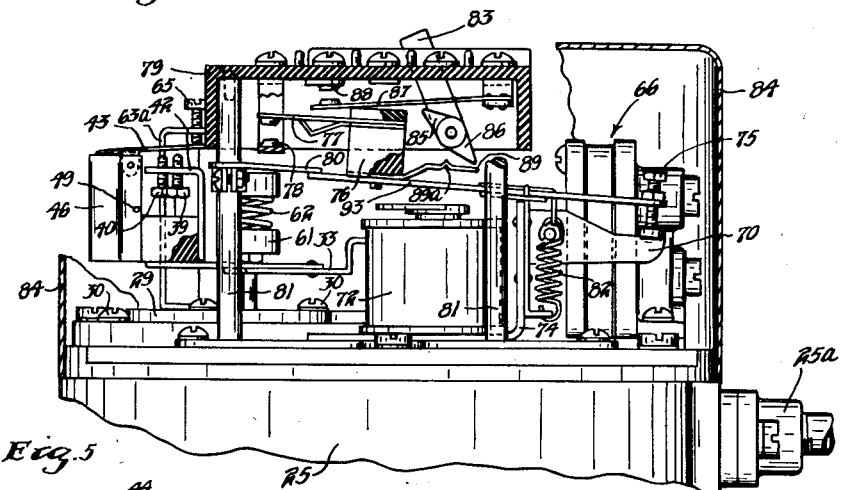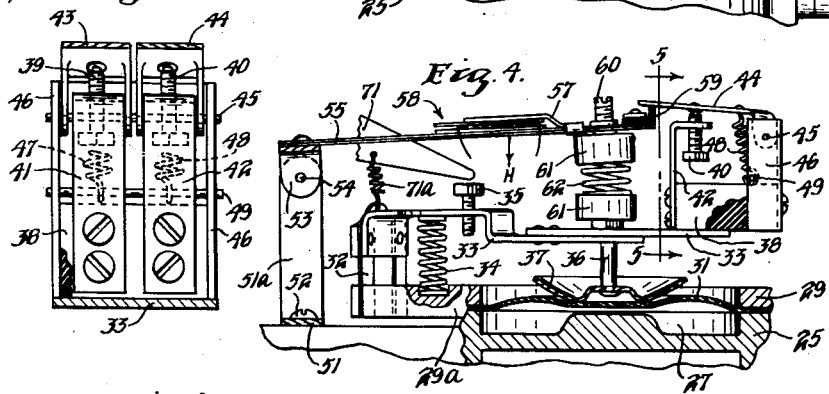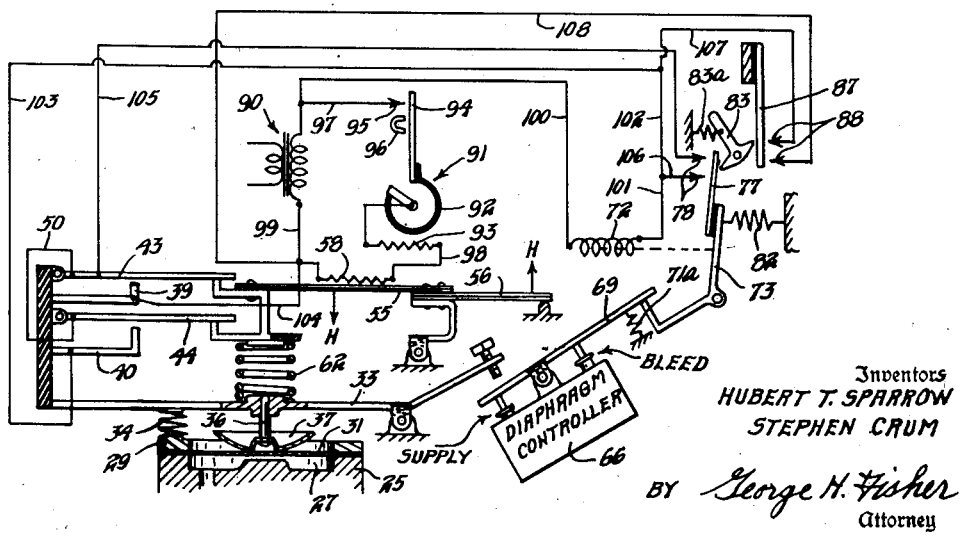

Patented Sept. 23, 1952

2,611,542

UNITED STATES PATENT OFFICE 2,611,542

FLUID-FLOW CONTROL DEVICE AND SYSTEM

Stephen Crum and Hubert T. Sparrow, Minneapolis, Minn., assignors to Minneapolis-Honeywell Regulator Company, Minneapolis, Minn., a corporation of Delaware Application August 23, 1948, Serial No. 45,746

19 Claims. (Cl. 236—68)

This invention relates to a fluid control device and associated apparatus forming a control system for regulating the flow of fluid between two points. More particularly, the invention relates to apparatus for initiating and controlling the flow of fuel gas from a supply source to a gas burner. The invention includes improvements over and additions to the fluid control device disclosed in the copending application of Daniel G. Taylor, Serial No. 503,771, filed September 25, 1943, and matured into Patent Number 2,461,615 on February 15, 1949.

One of the objects of the invention is to provide a fluid control device which is adapted to regulate the fluid flow therethrough in response to a plurality of varying conditions which normally occur while the fluid is flowing.

Another object of the invention to provide a control device which can initiate a desirable fluid flow and thereafter regulate said flow in accordance with pressure requirements and in accordance with additional requirements of a space to be affected by the fluid flow.

Another object of the invention is to provide a control device having a pressure regulator thereon and control means associated with said pressure regulator which is adapted to initiate the flow of fluid through the control device and to variably load the pressure regulator in response to a condition to be maintained due to a controlled rate of flow of the fluid.

A still further object of the invention is to provide control apparatus comprising a pressure regulator valve having power means for initially, variably, and resiliently loading the pressure regulator and having contact means associated with the pressure regulator and power means for controlling the initial opening and the closing of the valve.

Another object of the invention is to provide a control system or apparatus embodying the control device described above wherein the means for operating the loading means consists of a room thermostat having a heater electrically connected thereto for artificially heating the room thermostat each time it closes.

A further object of the invention is to provide a compact fluid control device which is adapted to initiate fluid flow and then to modulate the fluid flow in response to the combined effects of an outlet pressure sensing means and a temperature sensing means.

A still further object of the invention is to provide a fluid control device having a differential switching mechanism associated with a pressure regulator and a loading means for the pressure regulator for controlling the operation of an electrically operated pilot valve of the control device.

Still another object of the invention is to provide a control mechanism in a pressure regulating and modulating diaphragm valve which will first load a pressure regulating portion thereof for starting purposes and then actuate a valve controller thereof, thus assuring proper valve operation to establish reliable burner ignition.

Further objects of the invention will become apparent upon reading the following detailed description thereof in conjunction with the accompanying drawings wherein:

Figure 3 is a rear side elevational view of the device with portions thereof broken away;

Figure 4 is a cross-sectional view of a portion of the device taken along line 4—4 of Figure 2;

Figure 5 is a cross-sectional view of another portion of the device taken along lines 5—5 of Figure 4; and Figure 6 is a schematic showing of the control apparatus with a low voltage wiring circuit therefor.

Figure 1:
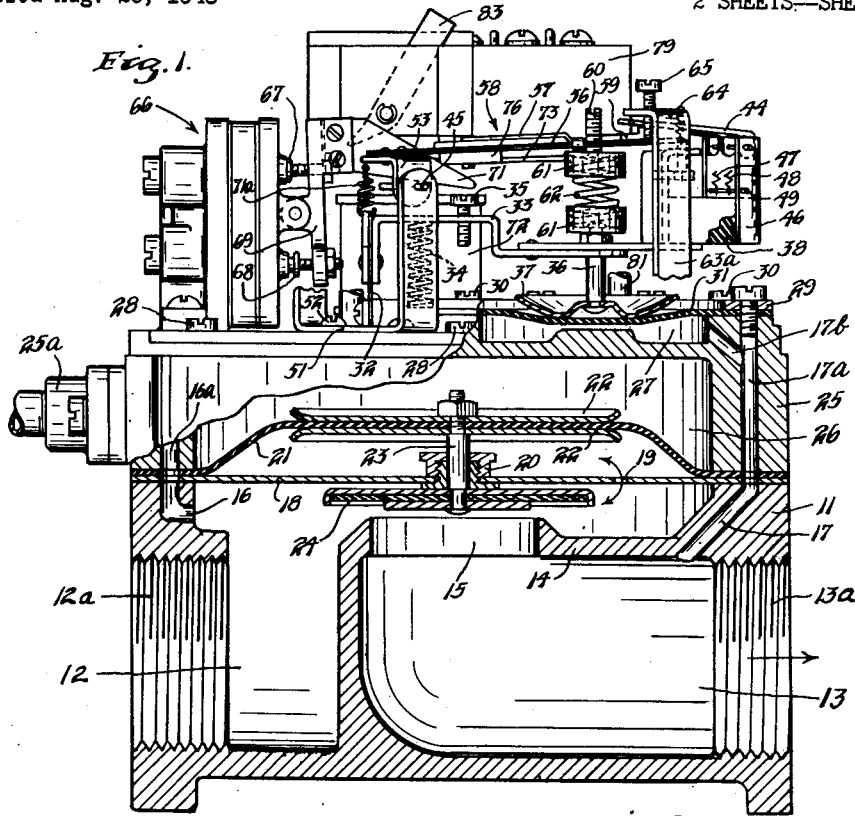
Figure 1 is a front side elevational view of the control device with portions thereof broken away.
Figure 2:
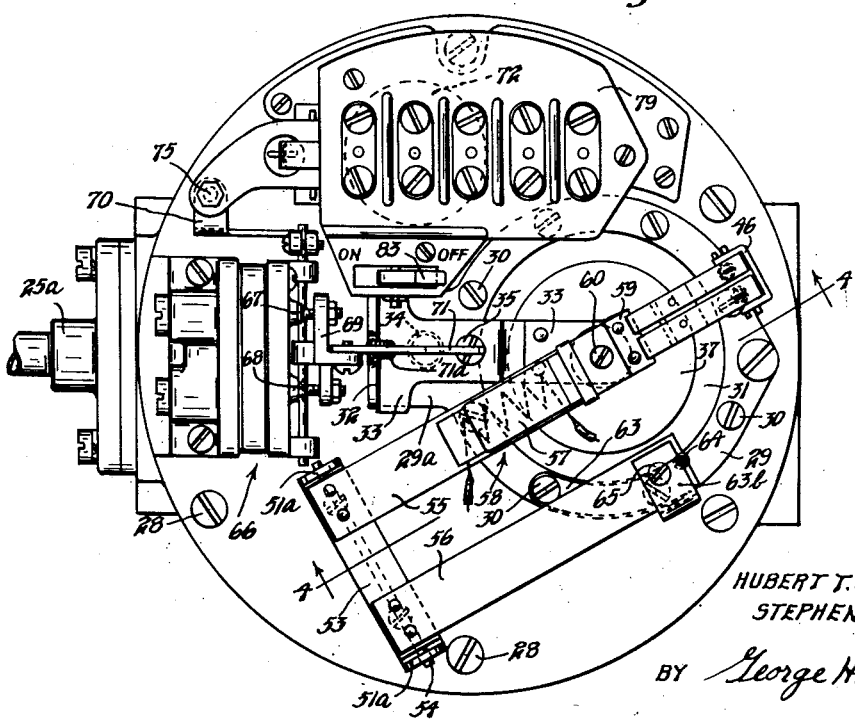
Figure 2 is a plan view of the control device with the cover removed.

While the control apparatus is adapted to be used to control the flow of various types of fluid, it is particularly suitable for controlling the flow of fuel gas to a gas burner, not shown in the drawing.

Referring to Figure 1 of the drawing, the control device comprises a lower casting 11 having an inlet 12 and an outlet 13 which are adapted to be secured by threads 12a and 13a to complementary fittings on a supply conduit and a discharge conduit (not shown). Partition wall 14 separates the inlet from the outlet and is apertured at 15 to permit the passage of fluid (hereinafter referred to as gas) from the inlet 12 to the outlet 13. Two generally vertical passages 16 and 17 extend through top wall portions of the lower casting from the inlet and the outlet sides, respectively, of the partition 14 for purposes to be described hereinafter.

Extending across an open top portion of the casting 11 is a rigid plate 18 having openings therein, adapted to align with the openings 16 and 17, and an opening 19 of such size as to permit the flow of gas therethrough at only a slow rate. Extending through an aperture in the central portion of the plate 18 is a screw and nut guide member 20 having a vertical bore therethrough in axial alignment with the aperture 15 in the partition wall 14.

Positioned above the plate 18 is a diaphragm 21 having apertures therein adapted to align with the passages or bores 16 and 17 and having plates 22 clamped to the central portion thereof by means of a valve stem 23 extending through the bearing member 20, plates 22 and the diaphragm 21. A valve 24, adapted to seal the opening 15, is riveted or otherwise secured to the lower end of the valve stem below the plate 18. It is thus seen that gas passing through opening 19 will exert a lifting force to the diaphragm 21 and plate 22 to cause the valve 24 to be biased toward an open position.

Positioned above the diaphragm 21 is an upper casting 25 having a recessed pressure chamber 26 in the lower side thereof, a pressure-regulator recessed chamber 27 in the upper surface thereof, a bore 16a in axial alignment with bore 16, a bore 17a in axial alignment with bore 17 and a bore 17b establishing communication between chamber 27 and bore 17a. Clamping screws 28 pass through the upper casting 25, diaphragm 21 and plate 19 and are screw-threaded into the lower casting 11 to hold these parts in assembled relationship.

Covering the top of chamber 27 and clamped to the peripheral upper wall surface thereof by means of a clamping ring 29 and screws 30 is a pressure-regulator diaphragm 31 which is adapted to move upwardly when gas under pressure is supplied to the chamber 27. Connected to a lateral projection 29a of the clamping ring 29, through a flexure pivot 32, is a pressure-regulator arm 33, the outer free end of which extends over the diaphragm 31. A compression spring 34, positioned between the clamping ring extension 29a and the arm 33, normally urges the control arm away from the diaphragm 31. Screw-threaded through an intermediate portion of the arm 33, is an adjustable abutment screw 35, the function of which will be described below. Secured to the arm 33 above the center of diaphragm 31, is a stem 36 which carries at the lower end thereof an arcuate plate 37 adapted to bear against the upper surface of diaphragm 31.

Mounted on the outer free end of the arm 33, is an insulation block 38. Two adjustable fixed contacts 39 and 40 are secured to the insulation block by means of brackets 41 and 42, respectively, and two pivoted contact arms 43 and 44 are mounted by pivot 45 on bracket 46, for cooperation with contacts 39 and 40, respectively. The bracket 46 is secured to the insulation block 38 and light springs 47 and 48 extending from contact arms 43 and 44, respectively, are anchored to the bracket 46 by means of rod 49. The operation of these contacts will be described hereinafter.

Means for loading the pressure regulator arm 33 and, consequently, the diaphragm 31, comprises a bracket member 51 secured to the top surface of the upper casting 11 by means of screws 52. A pivoted supporting member 53 is mounted by means of pivot 54 to the upper end of arms 51a and has rigidly secured thereto, one end each of two bimetallic arms 55 and 56. Mounted on arm 55 by means of a spring clip 57, is a resistance heater generally designated by the reference numeral 58. The outer free end of the arm 55 carries an insulation strip 59 which is adapted to bear against the under surfaces of the contact arms 43 and 44 and to normally hold these contact arms out of engagement with their cooperating fixed contacts 39 and 40. An adjustable screw 60 extends through the arm 55 into engagement with the upper of two cup-shaped spring retainers 61 holding a compression spring 62 between the lower end of screw 60 and the upper end of stem 36, which engages the lower cup 61. A bracket 63, mounted by means of screws 30 on the clamping ring 29, has an upwardly extending arm 63a (Figure 1) which carries a lateral extension 63b positioned above the outer free end of bimetallic arm 56. A tension spring 64 extends between the outer free end of the arm 56 and this lateral extension 63b and normally urges the two together. An adjustable abutment screw 65, screw-threaded through the lateral extension 63b, bears against the upper surface of the arm 56 to variably raise and lower the insulation strip 59 through the arm 56, support 53 and arm 55. The bimetallic arm 56 serves as an ambient temperature compensating element for the bimetallic arm 55 which responds to the heat developed by the heater 58, the energization of which will be described below. The bimetallic arms 55 and 56 are so arranged that their outer free ends thereof warp downwardly as the temperature thereof rises. It will thus be seen that as the arm 55 is heated and the insulation strip 59 lowers, the pivoted contact arms 43 and 44 are lowered into engagement with fixed contacts 39 and 40 while the loading spring 62 is being compressed to apply the desired load on the diaphragm 31. This arrangement insures adequate loading of the pressure regulator before the valve opens to permit the flow of gas therethrough. Any further movement of the strip 59, will cause the strip 59 to move away from the pivoted contact arms 43 and 44. Due to the fact that the insulation block 38 is mounted on the pressure regulator arm 33, it is obvious that any lifting of the diaphragm 31 due to a development of pressure in chamber 57, will not cause pivoted arms 43 and 44 to be raised with respect to contacts 39 and 40. It is thus seen that the above described arrangement enables a heat motor to cause a closing of electrical switches controlling the initial opening of the valve and the loading of a pressure regulator, which regulator may then function without disturbing the closed relationship of the contacts of the electrical switch. The utility of this feature of the invention will be more readily understood as the description of the invention continues.

A diaphragm controller, generally designated by the reference numeral 66, is of the conventional three way type, the details of which form no part of this invention. It is similar to the diaphragm controller shown in Figure 3 of Taylor Patent 2,349,209, in that it has a valve 67, shown in its open position in Figure 1, that establishes communication between bore 16a and pressure chamber 26 through suitable passages (not shown), and a bleed valve 68, shown in its closed position in Figure 1, for bleeding gas from chamber 26 to bleed outlet 25a through suitable passages (not shown). A pivoted actuating arm 69 has two oppositely extending crank arms 70 and 71. The arm 69 is normally biased in a direction to open the bleed valve and to close the supply valve by means of a tension spring 71a extending between crank arm 71 and the pivoted end of the pressure regulator arm 33. The adjustment screw 35 is so positioned that the outer end of crank arm 71 comes into engagement therewith when the bleed valve 68 is moved to its open position. It is thus seen that after the bleed valve has opened, gas pressure from the outlet 13 will be transmitted to chamber 27 causing upward movement of the diaphragm 31 and throttling of the bleed valve through the pressure regulator arm 33, thus causing the outlet pressure to be maintained at a desirable uniform pressure. Of course, the desirable pressure is determined by the loading of the spring 62 in response to the degree of heating of the heater 58.

The means for causing the diaphragm valve to open, by moving the bleed valve to open position, comprises a relay generally designated by the reference numeral 72. The armature 73 of the relay is pivoted on bracket 74 and carries an adjustable abutment screw 75 adapted to bear against the outer end of crank arm 70. An insulation block 76 is mounted on the other end of the armature 73 and supports a movable contact-bridging arm 77. A pair of fixed contacts 78 (one shown) cooperate with arm 77 when the relay is energized to establish a holding circuit to be described hereinafter. The contacts 78 are mounted on a terminal block 79. An adjustable abutment stop 80 is mounted on a support column 81 for the insulation terminal block 79 and limits the upward movement of armature 73. A tension spring 82 normally holds the armature in its retracted position wherein the bleed valve is held closed and the supply valve open against the bias of spring 71a. The relay 72 is energized from a suitable source of power, such as a transformer 90 (Figure 6), through contacts 39, 43, pigtail 50 (Figure 6), contacts 40 and 44 and lead wires, not shown except in the wiring diagram of Figure 6.

In order to provide for manual operation of the controller, in the event of power failure, and to provide for recycling upon resumption of power, a manual control lever 83 is provided to extend through an opening in the cover 84. This lever comprises two cam members 85 and 86 which are adapted to move a flexible contact-bridging arm 87 into engagement with fixed contacts 88 and to move the armature 73 through a spring detent member 89 to a position just short of its fully energized position. The arm 87 and contacts 88 establish a shunt circuit for the thermostat and a closed circuit from the secondary of transformer 90 through the relay 72. A spring 83a, shown schematically in Figure 6, will normally hold the manual lever 83 in its inoperative position, as shown in Figure 3, or return it to said position upon energization of the relay 72 causing disengagement of detent 89a from cam 86. It is thus seen that the manual actuator will hold the control device in operating position until power is resumed, whereupon the control of the device will be transferred to the automatic controls.

The control device shown in Figures 1 through 5 is shown in Figure 6 as being controlled by a well known "heat anticipating" type of room thermostat, generally designated by the reference numeral 91. The thermostat comprises a bimetallic element 92, a resistance heater 93, a movable contact arm 94 made of magnetic material, a fixed contact 95, and a permanent magnet 96 which is so positioned as to cause quick closing and opening of the contact arm 94 with contact 95. The thermostat is preferably placed in the space the temperature of which is to be controlled by the apparatus of this invention, in conjunction with a suitable fuel burner. It is obvious, however, that if the control device is positioned in the space to be controlled, it is possible that the thermostat 91 or some other condition responsive control means, could be mounted on most any suitable portion of the control device. It is also obvious that it would be possible to mount the transformer 90 on the control device and thus make the entire control apparatus in a single unit having only electrical power connections to the primary of the transformer, an inlet supply pipe, and an outlet or discharge pipe connecting it with other distinct objects or units.

From Figure 6 it will be noted that the room thermostat 91 is electrically connected in series with the heater 58 and the secondary of the transformer 90. Thus, when the contact arm 94 engages contact 95, a circuit will be completed from the top side of the transformer secondary through line 97, contact 95, contact arm 94, bimetallic member 92, heater 93, line 98, heater 58 and line 99 to the lower terminal of the transformer secondary. The upper terminal of the transformer secondary is also connected through line 100 to the left terminal of the relay 72. The right terminal of the relay 72 is connected through lines 101, 102, and 103 to contact 40. The lower terminal of the secondary of transformer 90 is connected through line 99 and line 104 to contact 39. As indicated above, a pigtail line 50 permanently and electrically connects the pivoted contact arms 43 and 44. A pigtail or flexible line 105 extends from contact arm 43 to the upper of two spaced contacts 78. The lower contact 78 is connected through line 106 and line 101 to the right hand terminal of the relay 72. The bridging contact arm 77 is adapted to bridge the contacts 78 when the arm 77 is moved against them, due to energization of the relay or manual actuation of the lever 83. The two spaced contacts 88 are positioned to be simultaneously bridged by the bridging arm 87 when the bridging arm 77 engages contacts 78. The upper contact 88 is connected through line 107, line 102 and line 101 to the right terminal of relay 72. The lower terminal 88 is connected through line 108 and line 99 to the lower terminal of the transformer secondary. It is thus seen that whenever contacts 88 are bridged, a circuit will be completed from the secondary of the transformer through the relay 72, regardless of the condition of the thermostat 91.

*Operation*

The elements of the control apparatus are shown in the drawings as being in the positions they would assume immediately following deenergization of the relay 72, which is a short time following the opening of the room thermostat's contacts. In this condition, the supply valve 67 is open and the bleed valve 68 is closed, thus delivering gas under pressure to the chamber 26; the diaphragm 21 and the connected valve 24 are lowering; the diaphragm 31 is lowering; and the contact levers 43 and 44 are being raised by the cooling of heater 58 and bimetallic arm 55.

Upon sufficient lowering of the room temperature, the thermostat contact arm 94 will engage contact 95 closing a circuit from the top side of transformer secondary, through line 97, contact 95, contact arm 94, bimetal 92, heater 93, line 98, heater 68, and line 99 back to the lower side of the transformer secondary. Heat will therefore be supplied to the bimetallic arm 55 causing it to warp downwardly; first bringing contact arm 43 into engagement with fixed contact 39, which does not energize relay 72 due to the fact that the contacts 78 are not bridged by the member 77, then lowering contact arm 44 into engagement with fixed contact 40. The closing of both pairs of contacts 39 and 43 and 40 and 44 completes a circuit from the upper terminal of the transformer secondary, line 100, relay 72, line 101, line 102, line 103, contact 40, contact arm 44, line 50, contact arm 43, contact 59, line 104, and line 99 back to the lower terminal of the transformer secondary. Energization of the relay 72 will cause the relay armature 73 to bridge contacts 78 and pull away from the crank arm 70 permitting the spring 71a to move the bleed valve inwardly to its open position and the supply valve outwardly to its closed position. This will cause gas under pressure in chamber 26 to be bled outwardly through a concealed passage to the bleed outlet 25a, thus permitting gas under supply pressure to lift the diaphragm 21 and the connected valve 24 to their open positions. The bridging of contacts 78 establishes a holding circuit for the relay from the upper terminal of the transformer secondary, through line 100, relay 72, line 101, line 106, line 105, contact lever 43, line 104, and line 99 to the lower terminal of the transformer secondary. It is thus seen that if the temperature of the room should rise slightly so as to lift contact arm 44 off of contact 40, an energizing circuit for the relay 72 will be maintained through contacts 39 and 43 and contacts 78. This provides the operating room temperature differential.

It will be noted that as the valve 24 is opened, gas at outlet pressure will be supplied to the chamber 27 below diaphragm 31 through passages 17, 17a and 17b. This will cause lifting of the pressure regulator arm 33 into engagement with the free end of crank arm 71, if it has not already engaged crank arm 71 due to the opening of the bleed valve, and a throttling of the bleed to maintain a uniform downstream gas pressure, as determined by the loading of spring 62. It will be noted that the upward movement of the pressure regulator arm 33 will not cause the lifting of contact levers 43 and 44 with respect to contacts 39 and 40 inasmuch as the pivoted ends of these contact levers are mounted on the outer end of the arm 33 and are movable therewith. Thus, should the outlet pressure increase beyond the desired amount due to changes in the supply pressure, the arm 33 will move the bleed valve toward its closed position and the supply valve toward its open position a sufficient amount to move the diaphragm and its supporting valve toward its closed position. The amount of movement will be sufficient to maintain a desired outlet pressure. With a drop in the outlet pressure, the reverse action takes place.

Each time that the room thermostat closes, the heater 93 will be energized which, after a short period of operation, it will artificially heat the thermostat up a few degrees and cause the contact arm 94 to break away from contact 95 against the pull of permanent magnet 96. However, should the room temperature fall to a temperature equal to the closing temperature of the contacts minus the number of degrees of artificial heat generated by heater 93, the contacts will remain closed and heat will be generated continuously in the heater 58 to cause the lowermost position of the bimetallic arm 55 to be reached. Thus, the maximum rate of fuel flow will be permitted through the control apparatus. As the length of the thermostat "on" periods and the frequency of the "on" periods will be generally proportional to the degree of cooling of the room, it will be apparent that the degree of heating of the bimetallic arm 55 by the heater 58 and the degree of loading of the pressure regulator spring 62 will be generally proportional to the degree of temperature drop in the room. It will thus be seen that the flow of gas to a furnace will be generally proportional to the heat demand, which is the desired operation of most heat generating units.

The closing cycle of the control device is deemed to be obvious from the above description of the opening cycle. Upon the room thermostat operating to break contacts 94 and 95, due to the room temperature reaching a desired level, the heater 58 will become deenergized causing the warping of bimetallic arm 55 upwardly to break the circuit to the relay 72. Deenergization of the relay, permits the strong spring 82 to override the weaker spring 71a and move the arm 69 to the position wherein it closes the bleed valve and opens the supply valve controlling the pressure in the diaphragm pressure chamber 26. This causes immediate movement of the diaphragm valve to its closed position where it will remain until there is a demand for heat.

In the event of power failure, which renders the transformer power source incapable of supplying current to the heater 58, the valve may be manually opened by moving lever 83 against the bias of a return spring 83a (Figure 6) to a position wherein the lower cam 86, as shown in Figure 3, rests behind a detent 89a on the relay supported arm 89, thus moving the armature almost to, but short of, the position it would assume if it were actuated by the relay. This will enable the control device to operate with pressure regulation at minimum loading only but without temperature regulation. Obviously, a predetermined loading of the pressure regulator diaphragm could be provided by adding a third cam, similar to cams 85 and 86 to engage and move arm 55 downwardly, as arm 87 is moved. Automatic recycling is provided by having cam 85 on the manual lever 83 move bridging contact arm 87 to engagement with contact 88, causing a direct connection of the relay 72 through these contacts 88 to the opposite sides of the transformer secondary. Power resumption will cause the relay 72 to become energized and pull the armature 73 inwardly an additional distance to cause disengagement of the detent 89a from the end of cam 86, permitting the spring 83a to return the manual control lever 83 to its inoperative position and the unbridging of contacts 88. While this will cause a transfer of the control of the device to the room thermostat, it is obvious that even though the contacts of the thermostat are closed, the heater 58 will be cold due to its previous unenergized condition. Thus, the relay will immediately drop out until the heater 58 causes the bimetallic arm 55 to move downwardly to close the circuit to the relay as described above and to thereafter operate in a normal manner.

Conclusion

While the preferred embodiment of the invention has been described above, it is obvious that slight changes in the shape of the elements of the control device, or substitutions of equivalents thereof, may be made without departing from the spirit of the invention. For example, a pressure responsive controller could be substituted for the room thermostat 91 to sense the steam pressure in a heating system or for sensing the pressure in some other type of fluid flow regulating system. Therefore, it is our wish that the scope of the invention will not be determined by the specific disclosure of the preferred embodiment of the invention, but solely by the appended claims.

We claim as our invention:

1. A control device comprising a fluid flow control means, a controller for said means, a first power means for moving said controller to a fluid flow permitting position, pressure responsive means for positioning said controller in accordance with outlet pressure of the device, resilient loading means for said pressure responsive means, second power means for regulating the force of said loading means, a manually operable switch having means for actuating said controller to said position and for completing a power circuit to said first power means, said switch being biased to return to its inoperative position when power is present in said circuit, and contacts positioned with respect to said pressure responsive means and said second power means so as to be operable thereby for controlling the energization of said first power means.

2. A control device comprising a fluid flow control means, a controller for said means, a first power means for moving said controller to a fluid flow permitting position, pressure responsive means for positioning said controller in accordance with outlet pressure of the device, resilient loading means for said pressure responsive means, second power means for regulating the force exerted by said loading means on said pressure responsive means in proportion to a varying condition, and two pairs of contacts positioned so as to be actuated by said pressure responsive means and said second power means for controlling the energization of said first power means.

3. A control device comprising a fluid flow control means, a controller for said means, a first power means for moving said controller to a fluid flow permitting position, pressure responsive means for positioning said controller in accordance with outlet pressure of the device, resilient loading means for said pressure responsive means, second power means for regulating the force of said loading means at any position of said pressure responsive means, and means positioned with respect to said pressure responsive means and said second power means so as to be operable thereby for controlling the energization of said first power means.

4. A control device comprising a fluid flow control means, a controller for said means, a first power means for moving said controller to a fluid flow permitting position, condition responsive means for positioning said controller in accordance with a variable condition of the device, loading means for said condition responsive means, second power means for regulating the force of said loading means, and means positioned to be actuated by said condition responsive means and said second power means for controlling the energization of said first power means.

5. In combination, a valve, a pressure motor for positioning said valve, a controller for regulating the pressure on said motor, a first power means for operating said controller, pressure responsive means for regulating the operating position of said controller, biasing means for said pressure responsive means, a second power means for adjusting said biasing means to variably load said pressure responsive means, and means positioned for actuation by said second power means to actuate said first power means.

6. A diaphragm valve comprising a diaphragm actuated main valve, a pilot valve for regulating the pressure on said diaphragm, first power means for operating said pilot valve, condition responsive means for regulating the operating position of said pilot valve, said condition responsive means having adjustable biasing means, second power means for adjusting said biasing means for variably loading said condition responsive means, and means mounted on said condition responsive means for actuation by said second means to actuate said first means.

7. A pressure actuated valve comprising a main valve, a pressure motor for actuating said main valve, a control valve for regulating the pressure on said motor, electric power means for operating said control valve, condition responsive means for regulating the operating position of said control valve, power means for variably loading said condition responsive means, and contacts positioned for actuation by said loading means to energize said electric power means.

8. In a valve unit having a main pressure actuated valve, a control valve therefor and a pressure responsive means for regulating said control valve in response to outlet pressure, the improvement comprising a heat motor, biasing means positioned between said motor and the pressure regulator, and contacts positioned for actuation by said motor to their closed position when said motor operates to increase the bias of said biasing.

9. In a valve unit having a main pressure actuated valve, a control valve therefor and a pressure responsive means for regulating said control valve in response to outlet pressure, the improvement comprising a heat motor, biasing means positioned between said motor and the pressure regulator, and contacts positioned for actuation by said motor to their closed position when said motor acts on said biasing means to increase the bias thereof, and condition responsive means for variably heating said motor so as to regulate the delivery of said valve unit in accordance with the value of said condition.

10. In a valve unit having a main valve, a relay operated controller for said valve, switch means for controlling energization of said controller and pressure responsive means for regulating the operating position of said controller in accordance with outlet pressure, the improvement comprising means for biasing said pressure responsive means, power operated condition responsive means positioned to load said biasing means and to control the operation of said switch means.

11. In a control device, a fluid flow controller biased toward a fluid flow position, power means for actuating said controller to an open position upon energization thereof but biased when deenergized to override the bias of said controller to move it to a no-flow position, pressure responsive means for varying the open position of said controller in response to fluid pressure in said device, contact means for controlling energization of said power means, and means for actuating said contact means and for variably loading said pressure responsive means.

12. In a control device, a fluid flow controller, power means for actuating said controller to a device opening position upon energization thereof, pressure responsive means for varying the position of said controller in response to fluid pressure in said device, contact means for controlling energization of said power means, and means for actuating said contact means and for variably loading said pressure responsive means.

13. In a control device, a fluid flow controller, power means for actuating said controller to a device opening position upon energization thereof, pressure responsive means for varying the position of said controller in response to fluid pressure in said device, contact means pivoted on said pressure responsive means for controlling energization of said power means, and power means for mechanically actuating said contact means and for variably loading said pressure responsive means mechanically.

14. In a control device, a fluid flow controller, power means for actuating said controller to an open position upon energization thereof, condition responsive means for varying the open position of said controller in response to a variable condition in said device, contact means for controlling energization of said power means, and power means for mechanically actuating said contact means and for variably loading said condition responsive means mechanically.

15. In a control device, a fluid flow controller, power means for actuating said controller to an open position upon energization thereof, condition responsive means for varying the open position of said controller in response to a variable condition in said device, contact means for controlling energization of said power means, and power means for mechanically actuating said contact means and for variably loading said condition responsive means mechanically, said loading means including a heat motor and resilient means between said motor and said condition responsive means.

16. A control system comprising fluid flow control means, a controller therefor, power means for actuating said controller, condition responsive means for regulating said controller to vary the fluid flow according to a variable condition in said control means, power-operated loading means for said condition responsive means, switch means operable by said loading means after energization thereof for energizing said power means, and a second condition responsive means for energizing said loading means.

17. A control system comprising fluid flow control means, a controller therefor, power means for actuating said controller, condition responsive means for regulating said controller to vary the fluid flow according to said condition, power operated loading means for said condition responsive means, switch means operable by said loading means after energization thereof for energizing said power means, and a second condition responsive means for energizing said loading means, said second condition responsive means having a thermostatic switch therein and a heater element electrically connected thereto to heat said thermostatic switch when said switch is closed.

18. A control system comprising fluid flow control means, a controller therefor, power means for actuating said controller, condition responsive means for regulating said controller to vary the fluid flow according to said condition, power-operated loading means for said condition responsive means, switch means operable by said loading means after energization of said loading means for energizing said power means, said switch means having two pairs of contacts which sequentially close and open for controlling initiating and holding circuits for said power means, and a second condition responsive means for energizing said loading means.

19. A control system comprising fluid flow control means, a controller therefor, power means for actuating said controller, condition responsive means for regulating said controller to vary the fluid flow according to said condition, power-operated loading means for said condition responsive means, switch means operable by said loading means after energization thereof for energizing said power means, said switch means having two pairs of contacts which sequentially close and open for controlling initiating and holding circuits for said power means, said power means being in series with said two pairs of contacts and having a normally open switch which shunts the second-closed pair of contacts when the power means is energized.

STEPHEN CRUM.
HUBERT T. SPARROW.

REFERENCES CITED

The following references are of record in the file of this patent:

UNITED STATES PATENTS

| Number | Name | Date |
|---|---|---|
| 2,170,310 | Shivers | Aug. 22, 1939 |
| 2,208,761 | Hartig | July 23, 1940 |
| 2,209,566 | Hornung | July 30, 1940 |
| 2,231,696 | Wolfe | Feb. 11, 1941 |
| 2,247,060 | Levine | June 24, 1941 |
| 2,437,894 | Ray | Mar. 16, 1948 |
| 2,461,615 | Taylor | Feb. 15, 1949 |